United States Patent [19]

Falusi et al.

[11] Patent Number: 5,039,258

[45] Date of Patent: Aug. 13, 1991

[54] HYDRAULIC TRANSPORTER WITH UNITED STREAMING REVERSING MEANS

[75] Inventors: Tamás Falusi; György Dobozi, both of Budapest; Csaba Ignácz, Budakalász; Dániel Pongracz; Rezsö Iring, both of Budapest; Béla Bódi, Gyöngyös; Pál Résch, Budapest; György Kallo, Budaörs; Attila Szivak, Budapest, all of Hungary

[73] Assignee: Energiagazdálkodási Intézet, Budapest, Hungary

[21] Appl. No.: 433,595

[22] Filed: Nov. 8, 1989

[30] Foreign Application Priority Data

Dec. 2, 1988 [HU] Hungary ............... 6152/88

[51] Int. Cl.⁵ .................................. B65G 53/04
[52] U.S. Cl. ................................ 406/46; 406/107; 406/183; 406/193
[58] Field of Search ............... 406/46, 47, 48, 105, 406/183, 108, 154, 38, 193, 107; 417/244, 900

[56] References Cited

U.S. PATENT DOCUMENTS

| | | | |
|---|---|---|---|
| 3,333,901 | 8/1967 | Hodgson et al. | 406/47 |
| 3,653,639 | 4/1972 | Mueller | 406/47 |
| 3,900,041 | 8/1975 | Kersch et al. | 406/47 |
| 4,116,368 | 9/1978 | Smith | 406/48 |
| 4,335,982 | 6/1982 | Bratschitsch | 406/48 |
| 4,479,362 | 10/1984 | McWhorter et al. | 406/47 |

Primary Examiner—Sherman Basinger
Assistant Examiner—Stephen P. Avila
Attorney, Agent, or Firm—Schweitzer Cornman & Gross

[57] ABSTRACT

A hydraulic liquid transporter for changing of different pressure and flows prevailing in three chambers that are separated from each other, having a slurry filling pump that has a suction side and a pressure side, the suction side of being connected to a mixture collecting container, the pressure side being connected to a first pressure line, a feeding space having of three feeding chambers being connected from said first pressure line, a discharging forwarding liquid pump having a suction side and a pressure side, the pressure side of the discharging forward liquid pump being connected to a second pressure line which is connected to a mixture delivering line, a discharge forwarding line connecting the suction side of the discharging forwarding liquid pump from the feeding space, a first integral flow reversing device for connection said first pressure line from said discharge forwarding line through said feeding space, a second integral flow reversal device for connecting said second pressure line from said mixture delivering line through the feeding space, both first and second integral flow reversing devices being arranged in a relative opposed relationship with their center lines substantially coinciding with each other.

6 Claims, 4 Drawing Sheets

HYDRAULIC TRANSPORTER WITH UNITED STREAMING REVERSING MEANS

FIELD OF THE INVENTION

The invention relates to a hydraulic transporter provided with integral flow reversing means for the changeover between different pressures and flows having been produced in separate spaces filled with liquid media and being under pressure. The spaces contain mixtures consisting of a liquid and solid components to transport the liquid and solid matter trough pipe under varying pressures and flow conditions.

BACKGROUND OF THE INVENTION

Various versions of cell type feeders are known, as formed with separated spaces for transporting particulate solids and liquids in pipelines. The objectives of these transporters is to enable actuation of remote pipelines under high pressure, or hydraulic transports, with pressure and flows produced by the pumping of liquids alone. The kinetic energy needed in the hydraulic systems for causing the mixture flow in the transporting pipeline will be obtained by pumping clean water. The task of the cells is to transmit pressure and flow of clean liquid required for high pressure flow. For this reason the structure of the apparatus should assure conditions for the transfer of pressure and flow.

Depending on the structural layout of known cells, feeders of containers are known comprising one or more small or large (50–200 m$^3$) cylindrical closed containers with undivided spaces, which can be placed under pressure; feeders are also known formed of two or three closed pipe chambers having each a length of 50 to 400 m.

Experience shows that mainly hydraulic transporters having pipe chambers are being principally used in practice.

DESCRIPTION OF THE INVENTION

The aim of our invention is mainly to provide apparatus of the aforementioned nature.

Accordingly, we describe herein only the development of feeders with pipe chambers and their connection to the present invention.

The basic concept of feeders with pipe chambers was disclosed by E. H. Reich and S. A. Jones in 1952, in U.S. Pat. No. 2,485,208 and German patent No. 928,153. This feeder has a mixture collecting container a filling slurry pump connected thereto, a liquid storing container, a pump for clean liquid connected thereto and at least two pipe chambers. The chambers are separated with traditional means, such as gate valves rotary valves, from one another and from a filling slurry pump communicating with the mixture collecting container, from the pump connected to the clear liquid storing container, respectively from the liquid storing container itself, and from the pipe that delivers the mixture. In a two-chamber device, changeover of pressure and flow will assure continuity of high pressure clear liquid flow, while in a feeder with three chambers also the continuity of the low pressure mixture stream can be assured. In the case of this solution the function of the chambers made from pipe tracts, namely transfer of pressure and flow, is realized by actuating the closing organs, namely by opening and closing them in a proper sequence.

The Reich-Jones feeder made from the pipe chambers and the gate valves is further improved by the solution of Hungarian patent No. 160,526, according to which the spaces of the chambers are interconnected while by-passing the gate valves separating the chambers through smaller pipes with smaller gate valves built therein. During use of this apparatus, prior to activating the gate valves required for the switching the flow, the differential pressures prevailing within the chambers are equalized through the smaller gate valves, and only thereafter are gate valves separating the chambers actuated to achieve switching of the mixture flow. With this solution detrimental effects can be eliminated which result from pressure differentials in the feeder.

U.S. Pat. No. 4,371,294 proposes the use of special pressure regulators arranged in the proximity of thy closing means for equalizing high pressure differentials. The pressure regulator contains a simple hydraulic cylinder which is divided by a piston into two cylinder spaces. One cylinder space communicates with the pipe chamber and the other space of the cylinder is filled with hydraulic oil. The pressure of this oil and thus the pressure prevailing in the chamber, can be adjusted to the desired value by an oil pump, a valve, another hydraulic cylinder and a pressure regulator. This solution is fairly complicated and expensive, and therefore it can be used only under special circumstances.

British patent No. 2,061,393 describes a hydraulic transporter in which chambers are arranged in a rotor rotatably disposed in a fixed housing. During rotation of the rotor one of the chambers will become connected to a low pressure filling circuit through the three openings therein. The chamber is filled and as soon as the rotor continues its rotary motion, the cell is connected with a high pressure circuit, in which the cell is discharged with a high pressure liquid of a temperature above the boiling point. The high pressure, high temperature liquid left in the cell is cooled in a high pressure cooling circuit, and after a further rotation of the rotor the chamber will be again connected to the low pressure filling circuit.

With this solution explosion like vapor formation is prevented by cooling, but the pressure differentials are not equalized prior to connecting the chamber with circuits of different pressures.

A chamber closure is described in Hungarian patent No. 192,458, by the aid of which feeders can be provided, in which shifting of pressures and flows induced in three spaces being separated from each other can be enabled so that a so called chamber lock is installed at both ends of each chamber. These chamber locks connect the cell spaces through a connecting duct each. On one end of the chamber locks it is provided with an open cylindrical lock that has two orifices on its mantle. A cylindrical hollow rotor that is rotatable coaxially with the housing around the longitudinal axis, is disposed in the housing, the inner space of which is facing towards the open end of the housing. An opening is formed on the mantle of the rotor which opening communicates with the inner space, and by rotating the rotor its opening can become aligned with the openings on the housing. The rotor is provided with actuating means, namely with a driving shaft that exits the housing through a sealed bearing.

Hungarian patent No. 192,675 describes the operation of the feeder with a flow reversing apparatus, which has an open cylindrical housing at one end. Three equally distributed openings are found on them mantle of the housing. A rotatable cylindrical hollow part is arranged in the housing coaxially with the longitudinal axis of the housing with its hollow space open to the interior of the housing. The hollow part can be rotated by a drive shaft led out from the housing. An opening is provided on the mantle of the rotatable inner part, communicating with the interior space, which can be turned to overlap any opening on the mantle of housing. The opening on the mantle of the cylindrical inner part is so dimensioned that the inner part of the interior space is connected to an opening on the mantle of the housing, or with both openings when it occupies an intermediate position between the two openings. Due to the use of the flow reversing apparatus no separate apparatus or step is required for equalizing the pressures actuating the feeder. This is because equalization of the pressure differential takes place as the inner part of the flow reversing apparatus is rotated at a suitably varied angular velocity.

Variable rotary motion is advantageous because various time periods are available for equalizing the pressure differentials of different magnitudes. This means that by opening spaces in which different pressures prevail into communication with each other, i.e. during the critical period of pressure equalization, rotary motions slows down, and it will be the slower the larger the pressure differential. At other times the angular velocity is high.

Use of the flow reversing apparatus that has cylindrical housing that is open at one end and which contains a coaxially disposed cylindrical hollow inner part which can be rotated around its longitudinal axis by a drive shaft led outside the housing, has been found to have several disadvantages.

In the feeder with the stream reversing means the feeding operation requires that the cylindric inner part of the two stream reversing means should turn simultaneously by 120° and after having so turned, the other two stream reversing means should start to turn together with identical velocities.

Flow reversing apparatus should be made so that they are adapted to contain the pressures arising therein, and so that the cylindrical interior components should be able to rotate under pressure. On the basis of their construction and operating pressures one can expect the occurrence of bidirectional force effects on arising in the axial direction of the cylindrical inner part, and the other being radial forces perpendicularly thereto. As a prerequisite to rotatability of the cylindrical inner part bearings with proper loadability are required to take up the power effects.

In the case of very high pressures (80–100 bar) and larger pipe diameters the forces exerted on the bearings are very high and, therefore, in some cases the cylindrical interior part cannot even be rotated. It has been the experience that due to the aforementioned reasons flow reversing apparatus can be installed only in pipelines with smaller diameters, such as 150-200 mm, and at medium pressures.

In the case of rotating surfaces it is a frequent practice to protect surface those parts that are subjected to abrasive effects, to insert so called exchangeable wear resisting inserts. A further generally applied measure for protecting rotary surfaces of systems delivering mixtures containing solid matter involves the use of the so called seepage water the pressure of which is greater than normal operating pressure. Use of wear resistant inserts and seepage water will considerably extend the useful life of the principal operating components.

A drawback of the wear reducing use of seepage water is that it is increases water consumption in the hydraulic delivery system, especially during longer working periods when due to the unavoidably increased wear the consumption of seepage water will also increase.

Experience has shown that in hydraulic transport devices increased wear appears mainly in arcuate pipe sections and pipe profiles due to the turbulent flow occurring therein. Wear in straight pipe sections occurs only at the bottom part of the pipelines and, therefore, the useful life of straight pipelines is trebled to the ability to rotate them. Since pipe profiles cannot be turned, they either have to be protected against wear, or they have to be exchanged more frequently. Experience has shown that the use of feeders with pipe chambers, that have gate valves, e.g. 12 gate valves, require the use of many arcuate pipe sections, and that number could not be appreciably reduced by the use of a stream reversing device. These represent source of possible failure, and they are also more expensive than using straight pipe sections.

Gate valves of feeders with gate valves and pipe chambers are known to be over dimensioned. That means that these are 1–10 fold larger, than the diameter of the applied pipe. It is a disadvantage that they cannot be mobilized. Feeders with flow reversing means have a smaller volume, however, but still require considerable space with drives assembled between two flow reversing means each and connected pipe profiles, especially in the case of employing larger dimensions.

To eliminate these drawbacks it seemed to be desirable to provide new flow reversing devices which perform the function of two flow reversing devices so that uniform rotation can be assured, while equalizing the "radial" and "axial" forces arising in the apparatus. This enables the creation and insertion into the feeding apparatus, of devices of any desired diameter using any desirable pressure.

The problem of wear of the closely fitted rotating surfaces, and keeping the value of the seepage water under a minimum level have to be solved to avoid change beyond a given value in the density of the given transported mixture during hydraulic delivery, even during a longer operating period. This is of special importance in the case of highly dense mixtures. When an undesirable amount of liquid could change the properties of the mixture.

DESCRIPTION OF THE INVENTION

It is desirable that the feeder built with the new flow reversing device should be built with straight pipe sections and that the unit should be able to be mobilized even in the case of larger dimensions.

Accordingly, the present invention relates to a hydraulic transporter combined with flow reversing devices for the changeover of different pressures and flows produced in three spaces separated from each other and filled with liquid medium under pressure; in the apparatus there is a filling slurry pump connected with its suction side to a mixture collecting tank, which communicates through a pressure duct, through a feeding space comprised of three feeding chambers and though an outlet with a liquid storing container and is connected to a mixture transporting line to the liquid storing container through a discharging delivering liquid pump connected by its suction side, which communicates through the pressure duct and the feeding space of three feeding chambers.

Novelty of the apparatus according to the invention is in that a single unified flow chamber is used for interconnecting the filling pressure line and the outflow line through the feeding spaces of the feeding chambers, and another single unified flow chamber is used for interconnecting the pressure of the liquid pump and the mixture delivery line through the feeding spaces of the feeding chambers. The water inlets actuating the unified flow changer are connected to the pressure line of the discharging delivering liquid pump. The two unified flow changes are arranged opposed to each other with their center lines in line. The integral flow reversing device has polygonal housings that are interconnected by three straight pipe sections each through pipe profiles connected to three pipe flanges, each coupled to the section A—A of the housing, while three each of the other pipe flanges are connected tot he other section (B—B) with three straight pipe sections each. The flanges of the straight pipe sections are connected to the chambers. In a given case, with the exception of the chambers, the feeder is arranged in a mobile container.

Both ends of the polygonal housing of the integral flow reversing device are open, and the axial lines of the cylindrical cavities in the section (A—A) of the polygonal housing are displaced by 60° with respect to the cylindrical cavities in the section (B—B). In the cylindrical body cylindrical cavities are formed that are axially straight and separated and open and are turned in an arc with respect to the mantle of the cylinder. On the mantle of the cylindrical body circular openings are formed in the two cylindrical cavities so that the axial lines of the cylindrical openings deviate from each other at an angle of 60°.

A one-way piston is built into the integral flow reversing device between the wear resistant insert and the connecting insert. The surface of the wear resistant insert that connects it to the one way piston, is formed as a spherical surface. A wear resistant layer is formed on the surface of the wearing insert which fits closely to the cylindrical body, as well as on the surface of the cylindrical body contacting the wearing insert.

Slits are formed that receive sealing rings on the inner surfaces of the cylindrical cavities in the sections of the polygonal housing, or respectively on the surface of the connecting insert. In the wall of the polygonal housing there is an opening for water inflow leading to the one-way piston, and a drain opening is formed there for water discharge.

An instrument each is for measuring density and quantity, is connected in all three chambers to a section of the integral flow reversing device to the flanges of the straight pipe sections. This instrument is connected to a central control unit.

The most important advantage of the arrangement according to the invention is that the apparatus fulfills the functions of two flow reversing devices simultaneously so that it assures uniform rotation and, at the same time radial and axial forces arising in the apparatus become equalized. As a result of this apparatus of any desired diameter and pressure can be provided and installed into the feeder.

DESCRIPTION OF THE DRAWING

A preferred embodiment of the hydraulic transporting apparatus provided with the integral flow reversing device according to the present invention is described in greater detail by reference being had to the enclosed drawing, wherein.

DESCRIPTION OF A PREFERRED EMBODIMENT

Figure 1:
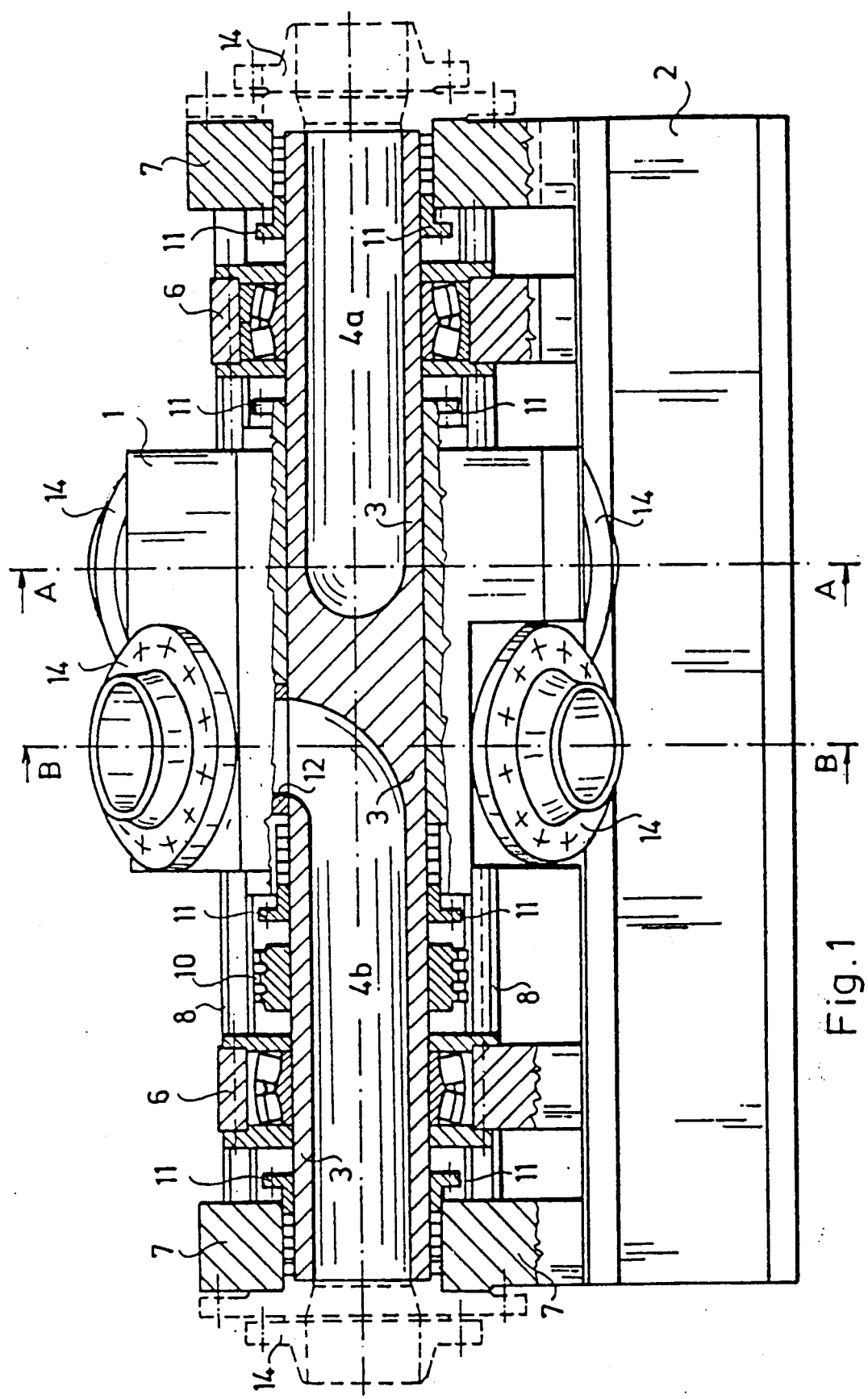
FIG. 1 is a longitudinal schematical cross sectional view of a preferred embodiment of the feeder according to the invention.
Figure 2A:
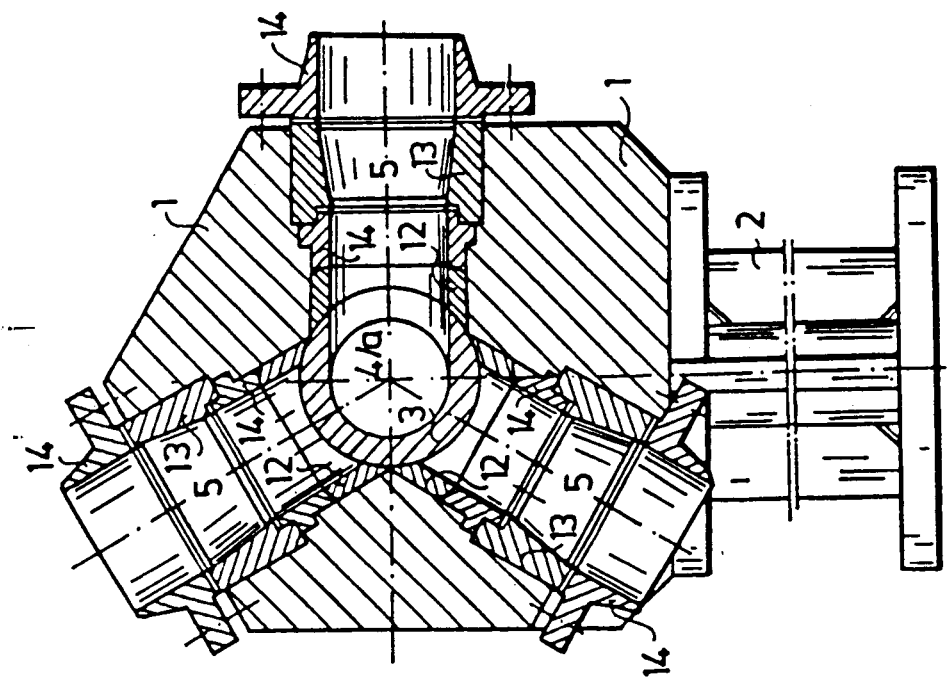
FIGS. 2a and 2b are cross sectional side views of the apparatus of FIG. 1, taken along the lines A—A and B—B respectively.
Figure 2B:
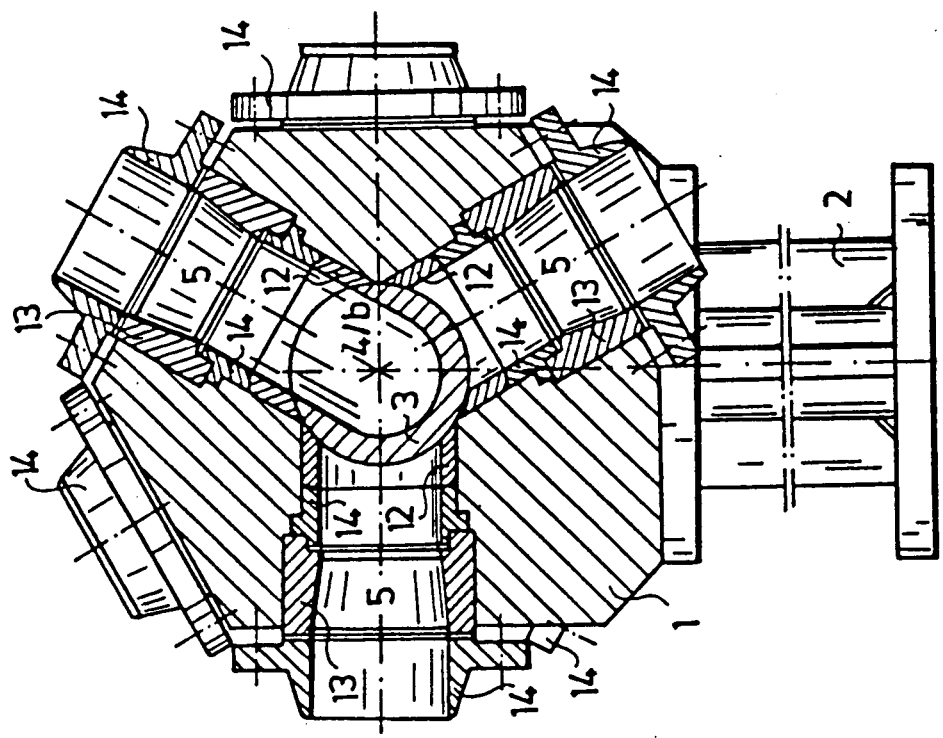
Figure 3:
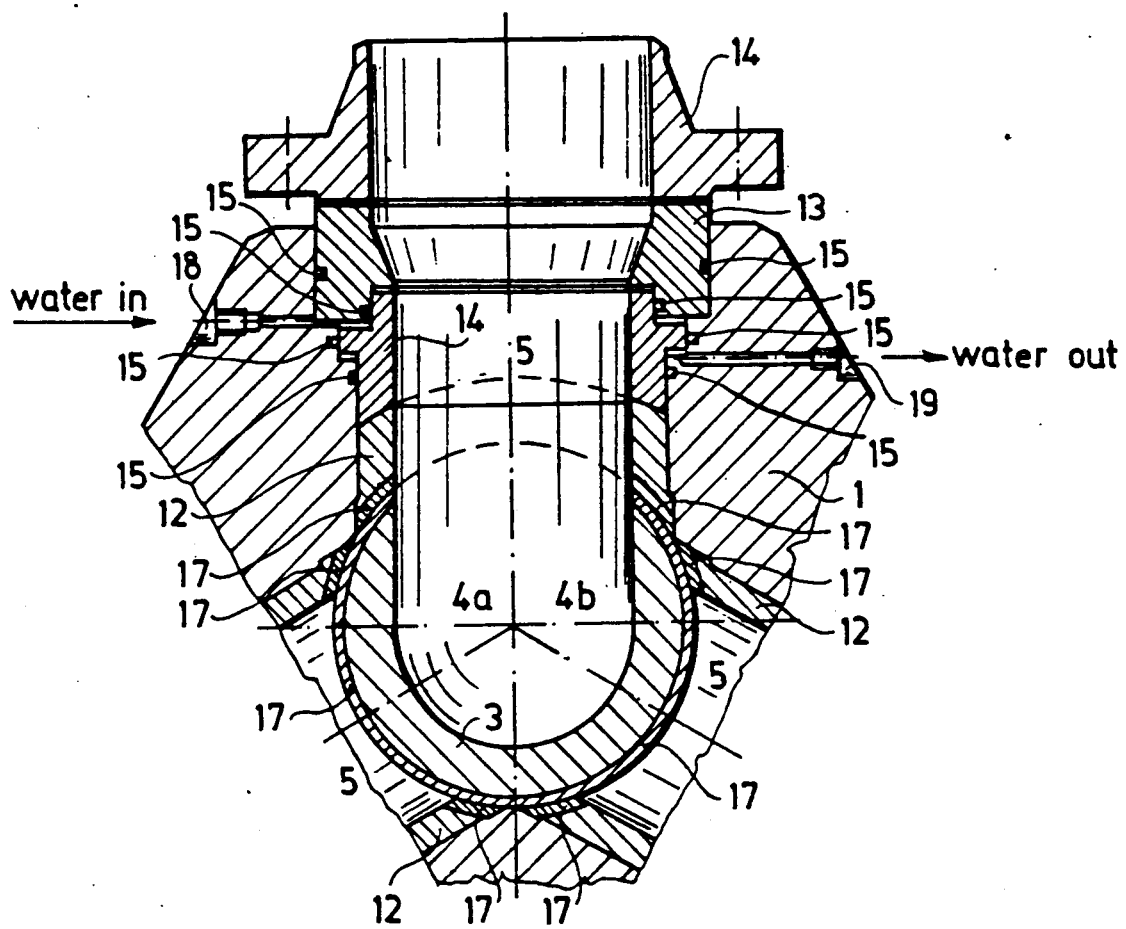
FIG. 3 schematically shows the placement of the apparatus of FIG. 1.
Figure 4:
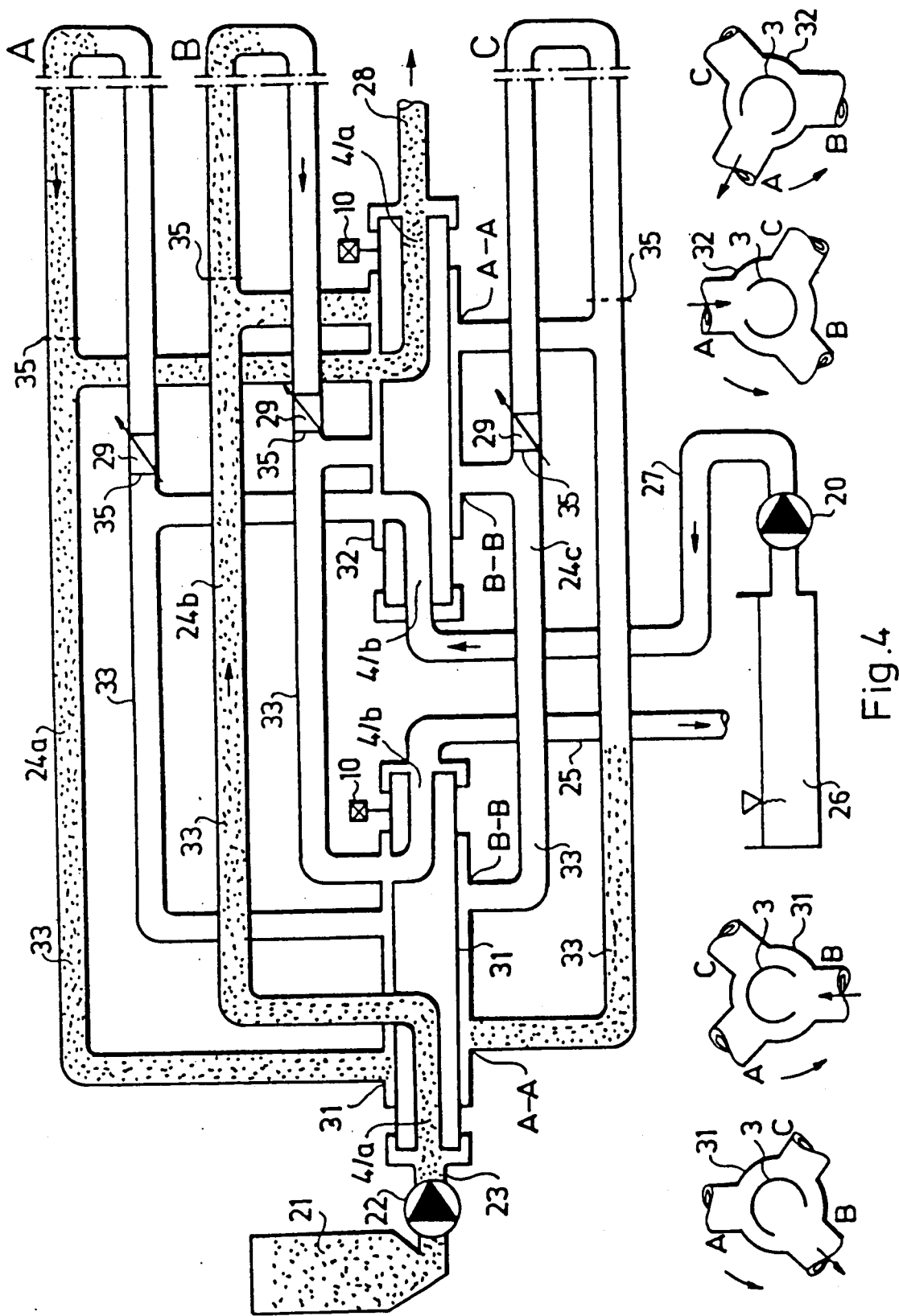
FIG. 4 shows an operating flow scheme of the operation of the feeder of FIGS. 1-3.

The device of the present invention replaces two flow reversing devices and due to its structural layout, it equalizes the radial and axial forces generated in the apparatus by having a polygonal housing 1 that is open at both ends, and formed with a cylindrical interior, supported on a stand 2. A cylindrical body 3 that is longer than the housing 1, is arranged in the housing 1 which can be rotated coaxially around the longitudinal axis. Three interior cavities 5 each are formed in the two adjacent sections A—A and B—B. Open cavities 4a and 4b that are separated from each other are formed within the rotatable cylindrical body 3. These cavities run straight in the lengthwise direction and are arced towards the mantle. The axial lines of the cavities 5 in the sections A—A and B—B of the housing 1 are displaced by 60° in respect to each other. The circular openings formed in the mantle of the cylinder of the cavities 4a, 4b within the rotary cylindrical body are also displaced by 60°. In this manner, while rotating, one of the cavities 4a or respectively 4b in the cylindrical body 3 communicates with one or more cavities 5 in either of the sections A—A or B—B of the polygonal housing, while the other cavity communicates with one or more cavities 5 in the other section A—A or B—B. The three cylindrical cavities 5 each in the sections A—A or B—B of the polygonal housing 1 are connected to the three feeding chambers A, B, and C (FIG. 4). The cylindrical body 3 is connected through its cavities 4a and 4b that are open in the axial directions to the low pressure slurry feeding pump 22 and the discharge line 25, or to the high pressure clean liquid pump 20 and to the delivery line 28.

Axial forces, directed towards the center of the integral flow reversing device become equalized. The radial forces are also or nearly equalized. Both ends of the cylindrical body 3 are supported on bearings 6, on supporting rings 7, and these are connected to push rods 8. The structure is rotated by a drive 10. The sealing of the rotating surfaces is accomplished by stuffing boxes 11.

In order to reduce wear of closely fitted rotary surfaces of the integral flow reversing device and to keep the quantity of seepage water at a minimal level, all of the cylindrical cavities 5 in the sections A—A and B—B of the polygonal housing 1 contain a wear insert 12 each and a connecting insert 13, and a one way piston 14 disposed between these inserts. The connecting surface between the wear insert 12 and the one way piston 14 is formed as a spherical surface with the radius R; on the surface of the wear insert 12 wear resistant layers 17 are formed fitting closely to the cylindrical body 3, and on the surfaces of the cylindrical body 3 contacting the wear insert 12. Additionally slits 15 are formed receiving the sealing rings on the inner surfaces of the cylindrical cavities in the sections A—A and B—B of the polygonal housing 1, or respectively on the surface of the connecting insert 13. In the wall of the polygonal housing 1 there is an opening 18 for water inflow leading to the one way piston 14, as well as a discharge line 19. The opening 18 communicates with the pressure line 23 of the pump 22 for the clean liquid, therefore, due to water pressure, the one way piston 14 presses the wear insert 12 against the surface closely fitting to the cylindrical body 3, and accordingly, the slot on the closely fitted surfaces of the wear insert 12 and the cylindrical body 3 will be very small and so only an insignificant quantity of water will flow into the interior of the integral flow reversing device.

FIG. 4 illustrates the flow scheme of the hydraulic transporter provided with integral flow reversing device.

In the hydraulic transporter the section side of the filling slurry pump 22 is connected to the mixture collecting container 21, communicates through its pressure line 23, through the feeding spaces 24a, 24b, 24c comprised of three feeding chambers A, B, C and a discharge duct, with the liquid storing container 26, while the liquid pump 20 that is connected with its suction side, is interconnected with the mixture transporting pipeline through the pressure line 27, the feeding spaces 24a, 24b, and 24c comprised of three feeding chambers A, B, C and so, that for connecting the filling pressure line 23 and the discharge line 25 through the feeding spaces 24a, 24b, 24c of the feeding chambers A, B, C, integral flow reversing device 31, is arranged, and for interconnecting the pressure line 27 of the liquid pump 20 and the mixture delivery line 28 through the feeding spaces 24a, 24b, 24c of the feeding chambers A, B, C in the same manner another integral flow reversing device 32 is provided. The water outlet openings 18 actuating the integral flow reversal devices 31, 32 communicate with the pressure line of the discharging transporting liquid pump 20. The two integral flow reversing devices are disposed opposite to each other, with their axial lines being in line. The three pipe flanges each connected to the section A—A of the polygonal housing 1 of the integral flow reversing devices 31, 32 are directly connected to each other. Three pipe flanges each connected to the section B—B of both integral flow reversing devices 31, 32 are connected to each other by three straight pipelines each.

With the exception of the pipe chambers, this part of the hydraulic transporter is arranged in a mobile container. This arrangement enables placing of simultaneously rotating parts into the integral flow reversing device, in which one flow reversing device 31 is built in on the low pressure side, while the other integral flow reversing device 32 is mounted on the high pressure side. Pressure conditions are such in both flow reversing devices 31, 32 that the axial and radial forces are mutually neutralized, and so the starting conditions enable the construction of feeders with spaces under high pressure and with large flow reversing devices. The task of the density and quantity measuring instruments 29 is to control the continuous functioning of the hydraulic transporter. The integral flow reversing devices 31, 32 are interconnected with straight pipe sections; and the flanges 35 on the pipe endings connect to the feeder chambers A, B, and C. The density and quantity measuring instruments 29 are coupled to a central control unit.

We claim:

1. A hydraulic liquid transporter for changing of different pressure and flows prevailing in three chambers that are separated from each other, which comprises a slurry filling pump having a suction side and a pressure side, the suction side of said pump being connected to a mixture collecting container, the pressure side of said pump being connected to a first pressure line, a feeding space comprised of three feeding chambers being connected from said first pressure line, a discharging forwarding liquid pump having a suction side and a pressure side, the pressure side of said discharging forwarding liquid pump being connected to a second pressure line which is connected to a mixture delivering line, a discharge forwarding line connecting the suction side of said discharging forwarding liquid pump from said feeding space, a first integral flow reversing device for connection said first pressure line from said discharge forwarding line through said feeding space, a second integral flow reversal device for connecting said second pressure line from said mixture delivering line through said feeding space, said first and said second integral flow reversing devices being arranged in a relative opposed relationship with their center lines substantially coinciding with each other.

2. The hydraulic liquid transporter of claim 1, further comprising a plurality of actuating water inflow openings communication with said second pressure line of said discharging forwarding pump, said first and said second integral flow reversing devices each having a polygonal housing, each of said housings being interconnected by three straight pipe sections each to a first section and a second section in said polygonal housing, said first and said second section containing a first cylindrical cavity and a plurality of pipe chambers, and a plurality of flanges for connecting said pipe sections from said feeding chambers.

3. The Hydraulic liquid transporter of claim 2, disposed within a mobile container, except for said feeding chambers.

4. The hydraulic liquid transporter of claim 2, wherein said polygonal housings each have two open ends, and the center line of the first cylindrical cavity in said first section is displaced by 60° relative to the center line of the first cylindrical cavity within said second section, a cylindrical body disposed within the first cylindrical cavity, and a plurality of second cylindrical cavities formed within said cylindrical body, said second cylindrical cavities being separate from each other and partially surrounding said cylindrical body in an arcuate manner.

5. The hydraulic liquid transporter of claim of claim 2, wherein said integral flow reversing device further comprises a wear insert, a connecting insert, and a one way piston disposed between said wear insert and said connecting insert, the surface of said wear insert being in contact with said one way piston and said surface has a spherical shape, and a wear resistant layer disposed on the surface of said cylindrical body, and a plurality of slits each containing sealing rings, formed on the inner surface of said first cylindrical cavity in said first and second sections of said polygonal housings and on the surface of said connecting insert, and a water inflow opening in the wall of the polygonal housing and communicating with said one way piston.

6. The hydraulic liquid transporter of claim 2, further comprising a plurality of instruments for measuring density and quantity, said instruments being disposed in each feeding chamber of said feeding space, in each said second section of each of said integral flow reversing devices, and in said flanges, and a central control unit for connecting all of said instruments.

* * * * *